United States Patent [19]

Colle et al.

[11] Patent Number: 5,600,044
[45] Date of Patent: Feb. 4, 1997

[54] METHOD FOR INHIBITING HYDRATE FORMATION

[75] Inventors: Karla S. Colle, Houston, Tex.; Christine A. Costello, Easton, Pa.; Russell H. Oelfke, Houston, Tex.; Larry D. Talley, Friendswood, Tex.; John M. Longo, Houston, Tex.; Enoch Berluche, Phillipsburg, N.J.

[73] Assignee: Exxon Production Research Company, Houston, Tex.

[21] Appl. No.: 449,151

[22] Filed: May 24, 1995

Related U.S. Application Data

[63] Continuation-in-part of Ser. No. 306,336, Sep. 15, 1994, abandoned.

[51] Int. Cl.$^6$ .............................. C07C 7/20; F17D 1/05; F15D 1/00
[52] U.S. Cl. .............................. 585/15; 585/950; 95/153; 137/3; 137/13; 166/310; 166/371
[58] Field of Search ........................ 585/15, 950; 95/153; 137/3, 13; 166/310, 371

[56] References Cited

U.S. PATENT DOCUMENTS

| | | | |
|---|---|---|---|
| 4,856,593 | 8/1989 | Matthews et al. | 106/310 |
| 4,915,176 | 4/1990 | Sugier et al. | 166/371 |
| 4,973,775 | 11/1990 | Sugier et al. | 585/15 |
| 5,076,364 | 12/1991 | Hale et al. | 166/310 |
| 5,076,373 | 12/1991 | Hale et al. | 175/40 |
| 5,244,878 | 9/1993 | Sugier et al. | 507/90 |
| 5,331,105 | 7/1994 | Duncum et al. | 585/800 |
| 5,420,370 | 5/1995 | Sloan, Jr. | 585/15 |
| 5,426,258 | 6/1995 | Thomas et al. | 208/188 |
| 5,432,292 | 7/1995 | Sloan, Jr. | 585/15 |
| 5,434,323 | 7/1995 | Durand et al. | 208/188 |

FOREIGN PATENT DOCUMENTS

| | | |
|---|---|---|
| 0309210A1 | 3/1989 | European Pat. Off. . |
| 0336501A2 | 10/1989 | European Pat. Off. . |
| 0457375A1 | 11/1991 | European Pat. Off. . |
| 0536950A1 | 4/1993 | European Pat. Off. . |
| 0582507A1 | 2/1994 | European Pat. Off. . |
| 0594479A1 | 4/1994 | European Pat. Off. . |
| 2618876 | 2/1989 | France . |
| 1391692 | 4/1988 | U.S.S.R. . |
| 1683807A1 | 10/1991 | U.S.S.R. . |
| 1799286A3 | 2/1993 | U.S.S.R. . |
| PCT/EP301519 | 12/1993 | WIPO . |
| PCT/US9311191 | 6/1994 | WIPO . |

OTHER PUBLICATIONS

Cha et al., "A Third-Surface Effect on Hydrate Formation", Journal of Physical Chemistry, vol. 92, pp. 6492–6494 1988 (no month).

Engelzos, "Kinetics of Gas Hydrate Formation and Kinetic Inhibition in Offshore Oil and Gas Operations", Proceeding of the Fifth (1995) Offshore and Polar Engineering Conference, The Hague, Netherlands, pp. 289–296 Jan. 1995.

Urdahl et al., "Inhibition of Gas Hydrate Formation by Means of Experimental Set-up for Characterization of Gas Hydrate Inhibitor Efficiency with Respect to Flow Properties and Deposition", Chem. Eng. Science, vol. 50, pp. 863–870 Mar. 1995.

U.S. Patent Application No. 07/979,588 by E. D. Sloan, Jr., filed Nov. 20, 1992.

U.S. CIP Patent Application No. 08/083,108 by E. D. Sloan, Jr., filed Jun. 24, 1993.

*Polymer Syntheses*, S. R. Sandler and W. Karo, vol. 1 (2nd Ed.), Chapter 12, Academic Press: New York, 1992 (No Month).

"Influence of the Formation of Crystal Hydrates of Liquids and Gases," Krasnov, Source Not Supplied, No. 81094.4, UDC 622.324.5:661.181.1.002.614, Publication Date Unknown.

"Effect of Surfactants on Hydrate Formation Kinetics," Kalogerakis et al. SPE 1993 International Oilfield Chemistry Symposium (new Orleans, 3/2–5/93) Proceedings 375–83 (1993).

"Surfactants in Oil Production,"Muijis, R. Soc. Chem., (Chemical Oil Ind. Developments & Applications) V 97, 277–97, 1991 (No Month).

"A Molecular Mechanism for Gas Hydrate Nucleation from Ice," Sloan, et al. AIChE Journal, vol. 37, No. 9, 1281–1292 (Sep. 1991).

(List continued on next page.)

*Primary Examiner*—Glenn A. Caldarola
*Assistant Examiner*—Walter D. Griffin
*Attorney, Agent, or Firm*—K. D. Van Tassel

[57] ABSTRACT

A method for inhibiting the formation of clathrate hydrates in a fluid having hydrate forming constituents is disclosed. More specifically, the method can be used in treating a petroleum fluid stream such as natural gas conveyed in a pipe to inhibit the formation of a hydrate restriction in the pipe. The hydrate inhibitors used for practicing the method are substantially water soluble polymers formed from a N-substituted acrylamide having two nitrogen substituent groups, $R_1$ and $R_2$, where $R_1$ is a hydrocarbon group having from one to ten carbon atoms and zero to four heteroatoms selected from the group consisting of nitrogen, oxygen, sulfur, and combinations thereof, and $R_2$ is a hydrogen atom or a hydrocarbon group having from one to ten carbon atoms selected from the group consisting of carbon, nitrogen, oxygen, and sulfur; alternatively, $R_1$ and $R_2$ may be linked to produce a cyclic ring having ten atoms comprising a combination of between three and ten carbon atoms and zero to four heteroatoms selected from the group consisting of nitrogen, oxygen, sulfur, and combinations thereof. Some examples of such inhibitors include, but are not limited to, poly(N-ethylacrylamide), poly(N,N-diethylacrylamide), poly(N-methyl, N-acrylamide), poly(iso-propylacrylamide), poly(n-propylacrylamide), poly(N-cyclopentylacrylamide), poly(N-cyclohexylacrylamide), poly(acryloylpiperdine), poly(acryloylpiperdine), poly(acryloylmorpholine) and various N-substituted acrylamide copolymers.

14 Claims, No Drawings

OTHER PUBLICATIONS

"Surfactants Studies as Hydrate–Formation Inhibitors," Kuliev et al., Gazovoe Delo (1972), (10), 17–19. (Translation enclosed). (No Month).

"Effect of Lower Alcohols on Formation of Crystallohydrates of Liquids and Gases," Krasnov, Gazovoe Delo (1966), (12), 9–11 (Translation enclosed)(No Month).

"Clathrate Hydrates," P. Englezos, Ind. Eng. Chem. Res. 1993, 32, 1251–1274 (No Month).

"Recent Developments in Gas Dehydration and Hydrate Inhibition," Hubbard et al., SPE 21507, pp. 263–276 (1991) (No Month).

"Natural Gas Hydrate Phase Equilibria and Kinetics: Understanding the State of the Art," Sloan, Revue De L'Institut Francais Du Petrole, (continued) vol. 45, No. 2, MARS–AVRIL 1990. Presented Jun. 9, 1989.

METHOD FOR INHIBITING HYDRATE FORMATION

This application is a continuation-in-part application of co-pending application Ser. No. 08/306,336 filed on Sept. 15, 1994, now abandoned.

FIELD OF THE INVENTION

The present invention relates to a method for inhibiting the formation of clathrate hydrates in a fluid. More specifically, the invention relates to a method for inhibiting the formation of gas hydrates in a pipe used to convey oil or gas.

BACKGROUND OF THE INVENTION

Carbon dioxide, hydrogen sulfide, and various hydrocarbons, such as methane, ethane, propane, normal butane and isobutane, are present in natural gas and other petroleum fluids. However, water is typically found mixed in varying amounts with such petroleum fluid constituents. Under conditions of elevated pressure and reduced temperature clathrate hydrates can form when such petroleum fluid constituents or other hydrate formers are mixed with water. Clathrate hydrates are water crystals which form a cage-like structure around guest molecules such as hydrate forming hydrocarbons or gases. Some hydrate forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Some hydrate forming gases include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of the natural gas and other petroleum fluids. For example, at a pressure of about 1 MPa, ethane can form gas hydrates at temperatures below 4° C., and at a pressure of 3 MPa, ethane can form gas hydrates at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions requires design and equipment modifications, such as insulated or jacketed piping. Such modifications are costly to implement and maintain. The amount of antifreeze required to prevent hydrate blockages is typically between 10% to 20% by weight of the water present in the oil or gas stream. Consequently, several thousand gallons per day of such solvents can be required. Such quantities present handling, storage, recovery, and potential toxicity issues to deal with. Moreover, these solvents are difficult to completely recover from the production or transportation stream.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

One method of practicing the present invention uses gas hydrate inhibitors which can be used in the concentration range of about 0.01% to about 5% by weight of the water present in the oil or gas stream. As discussed more fully below, the inhibitors of this invention can effectively treat a petroleum fluid having a water phase.

SUMMARY OF THE INVENTION

According to the invention there is provided a method for inhibiting the formation of clathrate hydrates in a fluid having hydrate forming constituents. The method comprises treating said fluid with an inhibitor comprising a substantially water soluble polymer produced from the following N-substituted acrylamide:

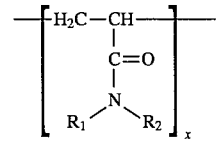

where, $R_1$ is a hydrocarbon group having one to ten carbon atoms and zero to four heteroatoms selected from the group consisting of nitrogen, oxygen, sulfur, and, combinations thereof, $R_2$ is hydrogen atom or a hydrocarbon group having one to ten carbon atoms and zero to four heteroatoms selected from the group consisting of nitrogen, oxygen, and sulfur, and combinations thereof, and, x is an average number of repeating monomeric units for producing an average molecular weight for said polymer between about 1,000 and about 6,000,000 for said polymer.

Preferably the method is practiced wherein $R_1$ is an alkyl, cycloalkyl, aryl, alkaryl, or aralkyl group having said zero to four heteroatoms and $R_2$ is a hydrogen atom or an alkyl, cycloakyl, aryl, alkaryl, or aralkyl group having said zero to four heteroatoms. However, the method may also be practiced wherein $R_1$ is an alkoxyalkyl, alkenyl, or alkynyl group having said zero to four heteroatoms and $R_2$ is an alkoxyalkyl, alkenyl, or alkynyl group having said zero to four heteroatoms. Also, the method may be practiced wherein $R_1$ and $R_2$ are linked to produce a cyclic moiety having between three and ten carbon atoms and said zero to four heteroatoms.

One embodiment of the invention includes treating the fluid with an inhibitor mixture having, (a) an inhibitor comprising a substantially water soluble polymer produced from the following N-substituted acrylamide:

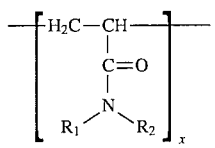

where,

R$_1$ is a hydrocarbon group having one to ten carbon atoms and zero to four heteroatoms selected from the group consisting of nitrogen, oxygen, sulfur, and, combinations thereof, R$_2$ is hydrogen atom or a hydrocarbon group having one to ten carbon atoms and zero to four heteroatoms selected from the group consisting of nitrogen, oxygen, and sulfur, and combinations thereof, and, x is an average number of repeating monomeric units for producing an average molecular weight for said polymer between about 1,000 and about 6,000,000 for said polymer, and;

b) a liquid for introducing said inhibitor into said fluid. Preferably, such liquid is an alcohol, water, brine, or some mixture thereof.

Some preferred inhibitors which can be used to practice the invention include, but are not limited to, substantially water soluble polymers that can be produced from a N-substituted acrylamide selected from the group consisting of poly(N-ethylacrylamide), poly(N,N-diethylacrylamide), poly(N-methyl,N-ethylacrylamide), poly(N-cyclopentylacrylamide), poly(N-cyclohexylacrylamide), poly(acryloylpyrrolidine), poly(acryloylpiperdine), poly(acryloylmorpholine) and N-substituted acrylamide copolymers. Furthermore, the nitrogen substituents for such water soluble polymers can be selected from the group consisting of a hydrogen, alkyl, and cycloalkyl groups.

DETAILED DESCRIPTION OF THE INVENTION

INVENTIVE METHOD

The inventive method inhibits the formation of clathrate hydrates in a fluid having hydrate forming constituents. Formation of clathrate hydrates means the nucleation, growth, and/or agglomeration of clathrate hydrates. Such clathrate hydrates may be formed in a fluid whether it is flowing or substantially stationary, but are often most problematic in flowing fluid streams conveyed in a pipe. For example, flow restrictions arising from partial or complete blockages in a fluid stream can arise as clathrate hydrates adhere to and accumulate along the inside wall of the pipe used to convey the fluid. Nonetheless, the invention can be used for inhibiting formation of clathrate hydrates in substantially stationary fluids.

In one embodiment of the invention, a concentrated solution or mixture of one or more of the inhibitors of the type described below is introduced into a petroleum fluid stream having an aqueous phase. As the inhibitor solution or mixture of this invention is substantially dissolved in the aqueous phase or dispersed in the fluid stream it reduces the rate that clathrate hydrates are formed, and thereby reduces the tendency for a flow restriction to occur.

In a preferred embodiment, the solid polymer is first dissolved into an appropriate carrier solvent or liquid to make a concentrated solution or mixture. It should be understood that many liquids may effectively facilitate treatment of the fluid stream without dissolving the inhibitor. Many liquids, however, will preferably dissolve the inhibitor and, for convenience, are referred to hereafter as solvents whether they produce an inhibitor solution, emulsion, or other type of mixture. The solvent's principal purpose is to act as a carrier for the inhibitor and to facilitate the inhibitor's absorption into the aqueous phase of the petroleum fluid. Any solvent suitable for delivering the inhibitor to the fluid's aqueous phase may be used. Such solvents include, but are not limited to, water, brine, sea water, produced water, methanol, ethanol, propanol, isopropanol, glycol, or mixtures of such solvents. Other solvents familiar to those skilled in the art may also be used.

It should be understood that the use of a carrier solvent is not required to practice the invention, but it is a convenient method of introducing the inhibitor into the fluid. In many applications the use of a carrier solvent will facilitate treatment of the fluid stream.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent the chemical composition of the inhibitor, the system temperature, and the inhibitor's solubility in the carrier solvent at application conditions.

The inhibitor mixture is introduced into the aqueous phase of the petroleum fluid using mechanical equipment, such as, chemical injection pumps, piping tees, injection fittings, and other devices which will be apparent to those skilled in the art. However, such equipment is not essential to practicing the invention. To ensure an efficient and effective treatment of the petroleum fluid with the inhibitor mixture two points should be considered.

First an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the inhibitor solution's viscosity is sufficiently low to facilitate its dispersion through the fluid and permit it to reach the aqueous phase.

Second, because the inhibitor primarily serves to inhibit the formation of clathrate hydrates, rather than reverse such formation, it is important to treat the fluid prior to substantial formation of clathrate hydrates. As a wet petroleum fluid cools, it will eventually reach a temperature, known as the hydrate equilibrium dissociation temperature or $T_{eq}$, below which hydrate formation is thermodynamically favored. A petroleum fluid's $T_{eq}$ will shift as the pressure applied to the fluid and the its composition change. Various methods of determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

The quantity of inhibitor introduced into a petroleum fluid with an aqueous phase solvent will typically vary between about 0.01 wt % to about 5 wt % by weight of the water present in the fluid. Preferably, the inhibitor concentration will be about 0.5 wt %. For example, a laboratory study has shown that adding 0.5 wt % of poly(N,N-diethylacrylamide) to a petroleum fluid allowed the fluid to cool to a temperature which was about 12° C. below its $T_{eq}$ without formation of a hydrate blockage. A higher inhibitor concentration can be used to lower the temperature at which a hydrate blockage is obtained. A suitable concentration for a particular application, however, can be determined by those skilled in the art by taking into account the inhibitor's performance under such application, the degree of inhibition required for the petroleum fluid, and the inhibitor's cost.

INHIBITOR DESCRIPTION

Compounds belonging to the group of polymers and copolymers of acrylamides, and mixtures thereof, are very effective inhibitors of hydrate nucleation, growth, and/or agglomeration (collectively referred to as hydrate formation). A generic structure of the acrylamide homopolymers is depicted as follows:

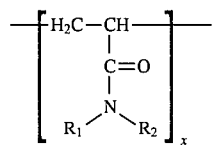

where $R_1$ is a hydrocarbon group having one to ten carbon atoms and zero to four heteroatoms selected from the group consisting of nitrogen, oxygen, sulfur, and, combinations thereof and $R_2$ is a hydrogen atom or a hydrocarbon group having one to ten carbon atoms and zero to four heteroatoms selected from the group consisting of nitrogen, oxygen, and sulfur, and combinations thereof,such that the resultant polymer is substantially water soluble, and x is an average number sufficient to produce an average molecular weight between 1,000 to about 6,000,000.

It is well understood by those skilled in the art that a given polymer composition is comprised of polymers having variable chain lengths and molecular weights, with some above and some below the polymer's average molecular weight. Therefore, some polymer chains contain less than x repeating units, and some polymer chains contain more than x repeating units. Accordingly, x represents an average number of repeating units over the distribution of polymer chains comprising a given polymer composition.

$R_1$ and $R_2$ may also be linked to produce a cyclic structure containing the nitrogen atom linking $R_1$ and $R_2$. The generic form of such a structure is shown below where X and Y have been substituted for $R_1$ and $R_2$.

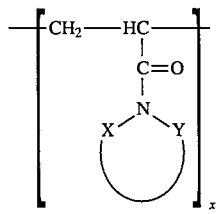

The cyclic structure produced by the X-Y linkage may contain up to 10 atoms, with 3 to 10 carbon atoms and zero to four heteroatoms, including but not limited to, nitrogen, oxygen, and/or sulfur.

N-substituted acrylamide copolymers are also effective inhibitors of hydrate nucleation, growth, and/or agglomeration. A generic structure of such copolymers is depicted as follows:

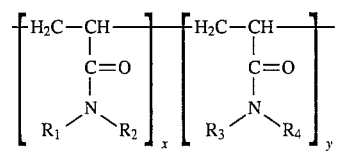

In such copolymers, the first monomer may have $R_1$ and $R_2$ in any combination of hydrogen, methyl, and ethyl groups provided $R_1$ and $R_2$ are not both hydrogen and the second monomer will have $R_3$=hydrogen, while $R_4$ may be $C_3$–$C_{10}$ alkyl group (branch, normal, or cyclic) with zero to four heteroatoms such that the resultant copolymer is substantially water soluble. Also, an acrylamide copolymer may be produced from an acrylamide monomer with a nitrogen containing cyclic group pendant to the carbonyl moiety. Generically, such a copolymer can be illustrated as follows.

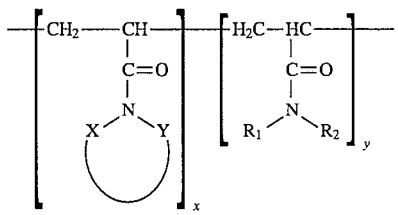

In mixed copolymers comprising an acrylamide monomer linked with another monomer type, the acrylamide monomer must not exceed a total of ten carbon atoms between $R_1$ and $R_2$. $R_1$ may be hydrogen or an alkyl group (normal, branched, or cyclic) having from one to ten carbon atoms and zero to four heteroatoms and $R_2$ may be an alkyl group (normal, branched, or cyclic) having from one to ten carbon atoms. Alternatively, the first and second nitrogen substituents of the acrylamide may be linked to form a nitrogen containing cyclic structure with three to ten carbon atoms and zero to four heteroatoms, including but not limited to, nitrogen, oxygen and/or sulfur. The other monomer in such mixed copolymers may be chosen from a class of monomers including, but not limited to, other N-substituted acrylamides, vinylpyrrolidone, vinylcaprolactam, vinyloxazolines, acrylates and vinyl carboxylates, such that the resultant copolymer is substantially water soluble. For example, vinylpyrrolidone could be copolymerized with N-butyl acrylamide to produce an effective inhibitor in the class of the mixed copolymers described above. Other monomers that could be copolymerized with N-substituted acrylamide monomers to produce a mixed copolymer inhibitor include Zwitterionic moieties such as N-(3-sulfopropyl)-N-methacryloylamidopropyl-N,N-dimethylammonium betaine (SPP).

These various acrylamide polymers and copolymers may be used in mixture with other substantially water soluble polymers, including but not limited to, polyvinylpyrrolidone (PVP), polyvinylcaprolactam (PVCap), copolymers of PVP or PVCap or N-acyl substituted polyalkeneimines.

Without limiting the scope of the invention, and for the purpose of illustrating the invention, various polymeric acrylamide inhibitors were evaluated including polyacrylamide, poly(N-methylacrylamide), poly(N-ethylacrylamide), poly(N,N-dimethylacrylamide), poly(N,N-diethylacrylamide) poly(acryloylpyrrolidine), poly(acryloylpiperdine), poly(acryloylmorpholine). These structures are depicted below.

PAM = Polyacrylamide ($R_1 = R_2 = H$)

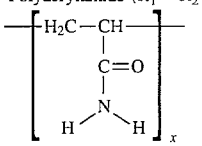

PMAM = Poly(N-methylacrylamide) ($R_1 = H$, $R_2 = CH_3$)

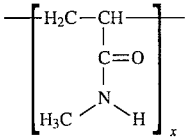

PEAM = Poly(N-ethylacrylamide) ($R_1 = H$, $R_2 = C_2H_5$)

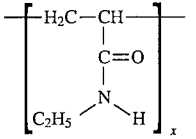

PDMAM = Poly(N,N-dimethylacrylamide) ($R_1 = R_2 = CH_3$)

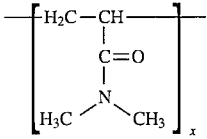

PDEAM = Poly(N,N-diethylacrylamide) ($R_1 = R_2 = C_2H_5$)

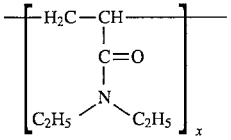

PAPYD = Poly(acryloylpyrrolidine)

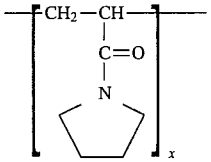

PAPID = Poly(acryloylpiperidine)

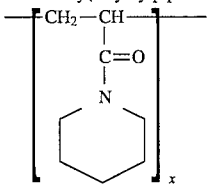

PAMPHL = Poly(acryloylmorpholine)

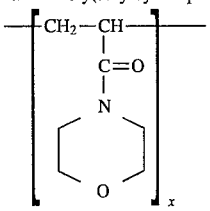

One copolymer comprising a 50:50 monomer ratio of N-n-propylacrylamide and vinylpyrrolidone was prepared for evaluation. The structure for this copolymer is provided below.

VP/NnPAM = Copolymer of Vinylpyrrolidone and N-n-propylacrylamide

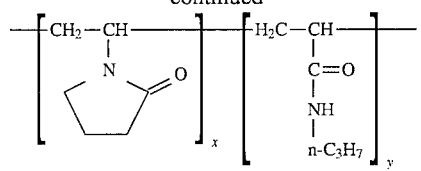

Two examples of a polyacrylamide with a cyclic substituent that are expected to be effective inhibitors, but not yet evaluated, are poly (N-cyclopentylacrylamide), poly (N-cyclohexylacrylamide) and a copolymer of acryloylhexamethyleneimine and vinyl pyrrolidone, depicted below.

PCPAM = Poly(N-cyclopentylacrylamide)
($R_1 = cycloC_5H_9$ and $R_2 = H$)

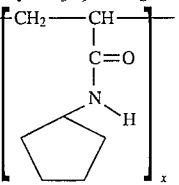

PCHAM = Poly(N-cyclohexylacrylamide)
($R_1 = C_6H_{11}$ and $R_2 = H$)

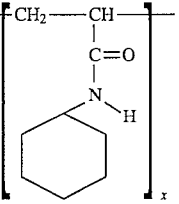

VP/AHMI = Copolymer of Acryloylhexamethyleneimine and Vinyl Pyrrolidone

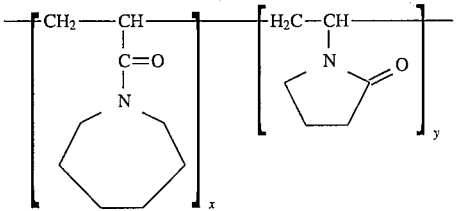

INHIBITOR SYNTHESIS
General Procedure

Many of these acrylamide polymers and copolymers, their monomers, and lactam polymers such as polyvinylpyrrolidone, and polyvinylcaprolactam are commercially available through chemical manufacturers. Other members of the acrylamide polymer class and monomers that are not commercially available may be readily synthesized by procedures known to those skilled in the art. References for representative polymer synthesis procedures may by found in S. R. Sandler and W. Karo, Polymer Syntheses, Vol. 1 (2nd Edition), Academic Press: New York, 1992, Chapter 12. Monomers which were not commercially available were synthesized from the appropriate amine and acryloyl chloride, using either benzene or diethyl ether as solvents, according to published procedures (see, e.g., S. Ito, *Kobunshi Ronbunshu*, 46(7), pp. 437–443, July 1989).

Where polymer synthesis was required, water was used as a solvent and ammonium persulfate was used as an initiator when the polymer was water soluble at the polymerization temperature. However, for polymers not soluble at the polymerization temperature, because they exhibit a lower critical solution temperature (LCST) in water, either benzene or methanol was used as a solvent and 2,2' azobis(2- methylpropionitrile) ("AIBN") was used as an initiator. For convenience, however, synthesis procedures for PDMAM and PDEAM are provided below.

Polymerization of N,N-dimethylacrylamide (DMAM)

DMAM was purified by fractional distillation at 80° C. and 13 torr. The DMAM was stored in the dark under nitrogen at 4° C. prior to use. Deionized water was degassed by bringing the water to a rapid boil while purging it with a strong argon purge for about 90 minutes. The purging continues until the deionized water cools to room temperature.

A 300 ml resin flask was equipped with a mechanical stirrer, condenser, thermometer, and an argon inlet/oulet. The flask was purged with argon for about 30 minutes. 193 ml of the degassed water was transferred to the resin flask under argon, then 19.24 g (194.1 mmol) of DMAM was transferred via cannula and dissolved with stirring. The reaction solution was brought to 60° C. while stirring and purging with argon, at which point an ammonium persulfate solution (0.044 g in 5 ml of deionized, degassed water) was transferred via cannula to the flask. After about five minutes of reaction time, polymerization was evident by a temperature rise to about 64° C. and an increase in the viscosity of the reaction mixture. Because of the reaction mixture's high viscosity, it was maintained at 60° C. overnight under argon but without stirring.

The following day the viscous polymer solution was removed from the flask and placed in a freeze-drier. The water was removed in accordance with the directions on the freeze-drier over about a 48 hour period. The reaction yields about 89% crude polymer product. The dried product was subsequently dissolved in methanol, precipitated with diethyl ether and dried in a vacuum oven at 50° C. and $10^{-3}$ torr. The structure of the polymer product, poly(N,N-dimethylacrylamide), was confirmed using carbon-13 and proton nuclear magnetic resonance (NMR) spectroscopy.

Polymerization of N,N-diethylacrylamide (DEAM)

DEAM was purified by vacuum distillation at 76° C. and 7 torr. The DEAM was stored in the dark under nitrogen at 4° C. prior to use. Deionized water was degassed by bringing the water to a rapid boil while purging it with a strong argon purge for about 90 minutes. The purging continues until the deionized water cools to room temperature.

A 300 ml resin flask was equipped with a mechanical stirrer, condenser, thermometer, and an argon inlet/oulet. The flask was purged with argon for about 30 minutes. 193 ml of the degassed water was transferred to the resin flask under argon, then 9.2 g (72.5 mmol) of DMAM was transferred via cannula and dissolved with stirring. The reaction solution was brought to 30° C. while stirring and purging with argon, at which point an ammonium persulfate solution (0.022 g in 5 ml of deionized, degassed water) was transferred via cannula to the flask. After about two hours and no sign of reaction, an additional aliquot of ammonium persulfate solution (0.040 g in 5 ml of deionized, degassed water) was introduced to the reaction mixture. The reaction mixture was maintained at 30° C. while stirring overnight.

The following day the reaction mixture has a milky appearance but clears upon cooling to room temperature. The polymer solution was removed from the flask and placed in a freeze-drier. The water was removed in accordance with the directions on the freeze-drier over about a 48 hour period. The reaction yields about 93% crude polymer product. The dried product was subsequently dissolved in tetrahydrofuran (THF), precipitated with hexane and dried in a vacuum oven at 60° C. and $10^{-3}$ torr. The structure of the polymer product, poly(N,N-diethylacrylamide), was confirmed using proton NMR spectroscopy.

Polymerization of Vinylpyrrolidone (VP) and N-n-propylacrylamide (NnPAM)

N-n-propylacrylamide (NnPAM) and vinylpyrrolidone were purchased from a commercial vendor and used as received. Anhydrous methanol was degassed by vigorously bubbling dry nitrogen through it.

A 250 mL flask equipped with a mechanical stirrer, condenser, thermometer, and a nitrogen inlet was purged with nitrogen. The flask was charged with NnPAM (0.1 mole, 11.34 g) and VP (0.1 mole, 11.13 g) in about 100 mL of degassed methanol. 0.26 g AIBN (azobisisobutyronitrile) was added, and the flask was heated to 65 C. for 8 hours with stirring. The reaction mixture was cooled, and the copolymer was isolated by removal of the solvent and drying overnight in a vacuum oven at 50 C. The structure of the copolymer (50:50 NnPAM:VP) was confirmed using carbon-13 NMR spectroscopy.

INHIBITOR EVALUATION

Laboratory Evaluation Procedures

THF Testing

One method for evaluating an inhibitor's effectiveness is a bench-scale atmospheric pressure test often referred to as a tetrahydrofuran or THF test. A THF test typically uses 3 mL of tetrahydrofuran (THF) and 9 mL of ASTM synthetic seawater (SSW) containing the desired amount of inhibitor additive. The THF and SSW are placed in a capped test tube (15 mm OD×12.5 cm long) with a 0.95 centimeter stainless steel ball. Each tube is placed in a ferriswheel-type holder and placed in a cooling bath held near 0° C. The tubes are rotated to facilitate mixing of the samples. The tubes are monitored visually and recorded with a video camera. As hydrate formation proceeds the viscosity of THF/SSW solution increases. In many instances the solution's viscosity will become high enough for the ball to stop moving. The time required for the stainless steel ball to stop moving the full length of the tube is referred to as ball stop time or BST.

The BST is an approximate indication of an inhibitor's effectiveness. Because the THF/SSW solution has a $T_{eq}$ of about 2°–5° C. and THF is miscible with water, hydrate formation is substantially accelerated for the THF/SSW solution as compared to petroleum fluids conveyed in a pipeline or flowline under typical field conditions. Therefore, BSTs are useful for indicating which inhibitors may be effective under field applications. A BST for a THF/SSW solution with an inhibitor which is about three times the BST for a THF/SSW control solution with no inhibitor present indicates that the inhibitor demonstrates a threshold inhibition effect. Therefore, as used herein, a threshold inhibition concentration ("TIC") means the inhibitor concentration in a THF/SSW solution required to produce a BST which is about three times the BST for a THF/SSW control solution. Because the THF test results are sensitive to variations in the temperature at which the test is run, rotation frequency of the tube, clearances between the stainless steel ball and tube wall, etc., it is important to run a THF/SSW control solution with each inhibitor evaluation to ensure that an inhibitor's TIC is accurately measured and that a reliable threshold inhibition effect is observed.

Mini-loop Testing

A second method for evaluating an inhibitor's effectiveness uses a bench-scale high pressure apparatus referred to as a mini-loop apparatus. A mini-loop apparatus consists of a loop of stainless steel tubing with about a one-half inch inside diameter and about ten feet in length. The loop also has a transparent section for observing the fluid flow in the loop and the onset of hydrate formation in the loop. Fluid comprising about 40% by volume SSW solution having about 3.5% total ionized salts, 40% by volume hydrocarbon condensate (i.e., $C_6+$), and 20% by volume hydrocarbon gas mixture is circulated around the loop at constant pressure. The hydrocarbon gas mixute is comprised of about 76 mole % methane, 9 mole % ethane, 7 mole % propane, 5 mole % n-butane, 2 mole % iso-butane, and 1 mole % of $C_5+$. The inhibitor is typically injected into the loop as an aqueous solution to produce the desired weight percent concentration of inhibitor in the aqueous sea salt/gas solution. Generally, many hydrate inhibitors are evaluated at about 0.5 wt. % of the aqueous sea salt/gas solution.

The fluid is circulated at a constant velocity of about 2.5 feet/second. The loop and its pump lay in a controlled temperature water bath for controlling the temperature of the fluid circulating in the loop. The bath's water is circulated to ensure uniform temperature throughout the bath and rapid heat transfer between the bath water and the loop. As the loop temperature changes or as hydrates form the gas volume in the loop will change accordingly. Therefore, to maintain constant pressure in the loop a pressure compensating device is required. Such a device can be comprised of a gas cell and a hydraulic oil cell separated by a floating piston. So as the gas volume in the loop changes, oil may be added or removed from the oil cell to produce a commensurate addition or removal of gas to the loop. Mini-loop tests are typically run at a pressure of about 1,000 pounds per square inch gauge (p.s.i.g.). However, any pressure between 0 to 3,000 p.s.i.g. could be selected for evaluating an inhibitor's performance.

The temperature of the water bath is reduced at a constant rate, preferably about 6° F. per hour, from an initial temperature of about 70° F. At some temperature, clathrate hydrates begin to rapidly form. As the dissolved gas is used to form clathrate hydrates, there is an abrupt and corresponding decrease in the volume of dissolved gas in the aqueous sea salt/gas solution. The temperature at which this abrupt decrease in the volume of dissolved gas is observed is known as the temperature of onset for hydrate formation ($T_{os}$). Recalling from the discussion above, the hydrate equilibrium dissociation temperature or $T_{eq}$ is the temperature below which hydrate formation is thermodynamically favored in an aqueous sea salt/gas solution without an inhibitor present. Therefore, another measure of an inhibitor's effectiveness is the difference between $T_{eq}$ and $T_{os}$ which is known as the inhibitor's subcooling, $T_{sub}$. Therefore, for a given pressure, the greater the subcooling the more effective the inhibitor. Typically, an aqueous sea salt/gas solution with no inhibitor present produces a $T_{sub}$ of about 6°–7° F.

THF and Mini-loop Test Results

Without limiting the scope of the invention, and for the purpose of illustrating the invention, various polymeric acrylamide inhibitors were evaluated including PAM, PMAM, PEAM, PDMAM, PDEAM, PAPYD, PAPID, PAMPHL and VP/NnPAM. All inhibitors except PDEAM and VP/NnPAM were evaluated at 0.5% by weight of the water present in the THF/SSW solution. PDEAM and VP/NnPAM were evaluated at 0.25 wt %. A THF/SSW solution with no inhibitor present was evaluated as a control.

TABLE 1

THF AND MINI-LOOP TEST RESULTS WITH POLYMERIC ACRYLAMIDE INHIBITORS

| INHIBITOR | CONC., WT % | BALL STOP TIME (MINUTES) | CONC., WT % | MINI-LOOP SUB-COOLING TEMP. (°F.) |
|---|---|---|---|---|
| None | — | 6 | — | 7 |
| PAM | 0.5 | 10 | — | — |
| PMAM | 0.5 | 41 | 0.5 | 11.7 |
| PEAM | 0.5 | >1136 | 0.5 | 15.5 |
| PDMAM | 0.5 | 14 | 0.5 | 11.4 |
| PDEAM | 0.25 | >1400 | 0.5 | 21.5 |
| PiPAM | 0.5 | 13 | 0.5 | 20.0 |
| VP/NnPAM | 0.25 | 80 | — | — |
| PAPYD | 0.5 | >1400, >3950 | 0.5 | 25.2 |

TABLE 1-continued

THF AND MINI-LOOP TEST RESULTS WITH POLYMERIC ACRYLAMIDE INHIBITORS

| INHIBITOR | CONC., WT % | BALL STOP TIME (MINUTES) | CONC., WT % | MINI-LOOP SUB-COOLING TEMP. (°F.) |
|---|---|---|---|---|
| PAPID | 0.5 | 28, 29 | 0.5 | 11.0 |
| PAMPHL | 0.5 | 13, 10 | 0.5 | 19.0 |

The results above show that certain acrylamides, such as PDMAM and PiPAM, do not have any THF threshold inhibition effect (i.e., greater than three times the BST for the uninhibited control), but nonetheless, do show a mini-loop threshold inhibition effect (i.e., a subcooling temperature at least 1.5° F. greater than the uninhibited control). For example, PiPAM has a 13 minute BST which is below the 18 minute BST for demonstrating a THF threshold inhibition effect, but a 20° F. mini-loop subcooling which is well above the 8.5° F. mini-loop subcooling for demonstrating a mini-loop threshold inhibition effect.

The THF and corresponding mini-loop test results for a given inhibitor indicates only that an inhibitor demonstrating a threshold inhibition effect under THF testing will also demonstrate a threshold inhibition effect under mini-loop testing. An inhibitor that fails to demonstrate a THF threshold inhibition effect under THF testing, however, may or may not demonstrate a threshold inhibition effect under mini-loop testing. Currently, there is no apparent method for quantitatively predicting an inhibitor's mini-loop performance based on its performance under THF testing. Mini-loop testing, however, more closely simulates the conditions, such as flow, pressure, and gas mixture, which are likely to be found in most field applications of the inhibitor. Consequently, mini-loop test results are a more reliable indicator than THF test results of an inhibitor's potential effectiveness under typical field applications.

The means and method invention and the best mode contemplated for practicing the invention have been described. It is to be understood that the foregoing is illustrative only and that other means and techniques can be employed without departing from the true scope of the invention defined in the following claims.

We claim:

1. A method for inhibiting the formation of clathrate hydrates in a fluid having hydrate forming constituents, said method comprising treating said fluid with an inhibitor comprising a substantially water soluble polymer having the following N-substituted acrylamide:

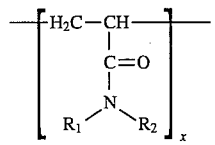

where,

R₁ is a hydrocarbon group having one to ten carbon atoms and zero to four heteroatoms selected from the group consisting of nitrogen, oxygen, sulfur, and, combinations thereof, R₂ is hydrogen atom or a hydrocarbon group having one to ten carbon atoms and zero to four heteroatoms selected from the group consisting of nitrogen, oxygen, and sulfur, and combinations thereof, and, x is an average number of repeating monomeric units for producing an average molecular weight for said polymer between about 1,000 and about 6,000,000 for said polymer.

2. The method of claim 1 wherein $R_1$ is an alkyl, cycloalkyl, aryl, alkaryl, or aralkyl group having said zero to four heteroatoms and $R_2$ is a hydrogen atom or an alkyl, cycloalkyl, aryl, alkaryl, or aralkyl group having said zero to four heteroatoms.

3. The method of claim 1 wherein $R_1$ is an alkoxyalkyl, alkenyl, or alkynyl group having said zero to four heteroatoms and $R_2$ is an alkoxyalkyl, alkenyl, or alkynyl group having said zero to four heteroatoms.

4. The method of claim 1 wherein $R_1$ and $R_2$ are linked to produce a cyclic moiety having up to ten atoms comprising a combination of between three and ten carbon atoms and said zero to four heteroatoms.

5. The method of claim 1 wherein said N-substituted acrylamide produces a polyalkylacrylamide selected from the group consisting of poly(iso-propylacrylamide), poly(n-propylacrylamide), poly(N-cyclopentylacrylamide), poly(N-cyclohexylacrylamide), copolymers formed from N-substituted acrylamides, and mixed copolymers formed from N-substituted acrylamides and monomers selected from the group consisting of vinylpyrrolidone, vinylcaprolactam, vinyloxazoline, acrylates, and vinyl carboxylates.

6. The method of claim 2 wherein said N-substituted acrylamide produces a polyalkylacrylamide selected from the group consisting of poly(acryloylpyrrolidine), poly(acryloylpiperdine), poly(acryloylmorpholine) copolymers formed from N-substituted acrylamides, and mixed copolymers formed from N-substituted acrylamides and monomers selected from the group consisting of vinylpyrrolidone, vinylcaprolactam, vinyloxazoline, acrylates, and vinyl carboxylates.

7. The method of claim 1 wherein said inhibitor further comprises a substantially water soluble polymer selected from the group consisting of polyvinylpyrrolidone, polyvinylcaprolactam, and N-acyl substituted polyalkeneimines.

8. A method for inhibiting the formation of clathrate hydrates in a fluid having hydrate forming constituents, said method comprising:
treating said fluid with an inhibitor mixture having,
a) an inhibitor comprising a substantially water soluble polymer having the following N-substituted acrylamide:

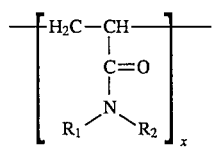

where,
$R_1$ is a hydrocarbon group having one to ten carbon atoms and zero to four heteroatoms selected from the group consisting of nitrogen, oxygen, sulfur, and, combinations thereof,
$R_2$ is hydrogen atom or a hydrocarbon group having one to ten carbon atoms and zero to four heteroatoms selected from the group consisting of nitrogen, oxygen, and sulfur, and combinations thereof, and,
x is an average number of repeating monomeric units for producing an average molecular weight for said polymer between about 1,000 and about 6,000,000 for said polymer, and;

b) a liquid used for introducing said inhibitor into said fluid.

9. The method of claim 8 wherein said N-substituted acrylamide produces a polyalkylacrylamide selected from the group consisting of poly(N-methylacrylamide), poly(N-ethylacrylamide), poly(N,N-diethylacrylamide), poly(N-methyl,N-ethylacrylamide),poly(isopropylacrylamide), poly(n-propyl acrylamide), poly(N-cyclopentylacrylamide), and poly(N-cyclohexylacrylamide), copolymers formed from N-substituted acrylamides, and mixed copolymers formed from N-substituted acrylamides and monomers selected from the group consisting of vinylpyrrolidone, vinylcaprolactam, vinyloxazoline, acrylates, and vinyl carboxylates.

10. The method of claim 8 wherein $R_1$ is selected from the group consisting of an alkyl group and a cycloalkyl group and $R_2$ is selected from the group consisting of hydrogen, an alkyl group, and a cycloalkyl group.

11. The method of claim 8 wherein said inhibitor mixture further comprises a substantially water soluble polymer selected from the group consisting of polyvinylpyrrolidone, polyvinylcaprolactam, and N-acyl substituted polyalkeneimine.

12. The method of claim 8 wherein said liquid is selected from the group consisting of an alcohol, water, and brine.

13. The method of claim 8 wherein $R_1$ and $R_2$ are linked to produce a cyclic moiety having up to ten atoms comprising a combination of between three and ten carbon atoms and said zero to four heteroatoms.

14. A method for inhibiting the formation of clathrate hydrates in a pipe containing a petroleum fluid stream having hydrate forming constituents, said method comprising:
a) producing an inhibitor mixture having,
2) an inhibitor comprising comprising a substantially water soluble polymer produced from the following N-substituted acrylamide:

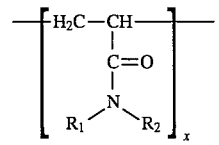

where,
$R_1$ is a hydrocarbon group having one to ten carbon atoms and zero to four heteroatoms selected from the group consisting of nitrogen, oxygen, sulfur, and, combinations thereof,
$R_2$ is hydrogen atom or a hydrocarbon group having one to ten carbon atoms and zero to four heteroatoms selected from the group consisting of nitrogen, oxygen, and sulfur, and combinations thereof, and,
x is an average number of repeating monomeric units for producing an average molecular weight for said polymer between about 1,000 and about 6,000,000 for said polymer, and;
2) a liquid used for used for introducing said inhibitor into said fluid; and
b) introducing said inhibitor mixture into said petroleum fluid stream, thereby inhibiting the formation of a hydrate restriction in said pipe.

* * * * *